(12) United States Patent
Roth

(10) Patent No.: US 7,887,040 B2
(45) Date of Patent: Feb. 15, 2011

(54) SHEET DECELERATION APPARATUS AND METHOD WITH KICKER

(75) Inventor: Curtis A. Roth, Post Falls, ID (US)

(73) Assignee: J & L Group International, LLC, Keithville, LA (US)

(*) Notice: Subject to any disclaimer, the term of this patent is extended or adjusted under 35 U.S.C. 154(b) by 213 days.

(21) Appl. No.: 12/351,496

(22) Filed: Jan. 9, 2009

(65) Prior Publication Data
US 2010/0176549 A1    Jul. 15, 2010

(51) Int. Cl.
B65H 29/54    (2006.01)
(52) U.S. Cl. .................. 271/69; 271/177; 271/182; 271/197; 271/202; 271/900
(58) Field of Classification Search .......... 271/308, 271/182, 202, 69, 197, 900, 177
See application file for complete search history.

(56) References Cited

U.S. PATENT DOCUMENTS

| | | | |
|---|---|---|---|
| 5,904,465 A | | 5/1999 | Fernandez |
| 6,131,901 A | * | 10/2000 | Hirohata ............... 271/276 |
| 7,052,009 B2 | * | 5/2006 | Roth ..................... 271/182 |
| 2004/0251603 A1 | * | 12/2004 | Roth ..................... 271/182 |

FOREIGN PATENT DOCUMENTS

| | | |
|---|---|---|
| DE | 23 43 678 | 3/1975 |
| DE | 3938536 | 6/1990 |
| DE | 198 17 064 | 4/1999 |
| DE | 19817064 A1 * | 4/1999 |
| EP | 0150655 | 8/1985 |
| JP | 2006 044858 | 2/2006 |

* cited by examiner

*Primary Examiner*—Michael R Mansen
*Assistant Examiner*—Gerald W McClain
(74) *Attorney, Agent, or Firm*—Dorsey & Whitney LLP; Nate Witzany, Esq.

(57) ABSTRACT

A sheet deceleration apparatus includes a pair of rotatable rollers, being rotatable about first and second axes, the rollers positioned on opposite sides of the travel path. At least one of the rollers is moveable relative to the other to nip the sheet between the rollers to reduce the travel speed of the sheet. A vacuum conveyor is further provided along the travel path subsequent the pair of rollers to control delivery of the sheet to a stacking hopper. A third rotatable roller, or similar apparatus, may be included in some embodiments, for pushing the sheet of material away from the vacuum conveyor at the appropriate time.

13 Claims, 11 Drawing Sheets

SHEET DECELERATION APPARATUS AND METHOD WITH KICKER

FIELD OF THE INVENTION

The present disclosure relates generally to a sheet deceleration apparatus and method and more specifically to a sheet deceleration apparatus and method for use in controlling the speed of a sheet of corrugated board or other sheet material as it leaves the entry or line conveyor and enters a stacking hopper.

BACKGROUND OF THE INVENTION

Sheets of corrugated board, paperboard, fiberboard or other sheet material are conventionally conveyed to a stacking hopper on an entry or line conveyor. In some cases, the sheets are overlapped or shingled, while in other cases, gaps in the direction of movement are provided between adjacent sheets. Because many of the sheets have flaps or other protrusions at their leading edges, overlapped or shingled sheets are often not desirable. The sheets are projected off the end of the entry conveyor and over a stacking hopper. The stacking hopper includes a generally vertical backstop and a forwardly positioned back tamper to define a bin or area to receive the sheets in stacked form. The capacity of a particular sheet stacking apparatus is determined by the number of sheets that can be stacked per unit of time. In general, this is directly related to the speed of the entry conveyor. The greater the speed of the entry conveyor, the greater the number of sheets that can be stacked in a unit of time, and thus the greater the stacking capacity of the sheet stacking apparatus. As the speed of the entry conveyor is increased, however, the sheets are projected over the stacking hopper and against the backstop at an increased speed. At elevated speeds beyond a certain speed (usually about 500 feet per minute for certain sheets), the projection against the backstop results in the sheet bouncing back toward the entry conveyor and/or possible damage to protruding tabs or flaps on the leading edge of the sheet. Accordingly, without deceleration means, a sheet stacker has a certain maximum operational speed.

To improve the capacity of the stacker beyond that point, it is necessary to decelerate or slow down the speed of the sheets as they leave the entry conveyor and before they reach the backstop. The prior art includes various deceleration apparatus which function to decelerate or slow down the speed of the sheets in this region. One such prior art machine utilizes a set or pair of spatially fixed rollers at the end of the entry conveyor and prior to the stacking hopper. In this particular apparatus, the nip rollers are positioned on opposite sides of the sheet and are designed to run or be driven at the entry conveyor line speed for most of the length of the sheet. As the trailing edge of the sheet approaches these rollers, they are decelerated to a desired lower speed to slow the sheet. After the sheet has passed, the rollers are accelerated back to line speed before the next sheet arrives. A limitation of this apparatus includes the physical limitations of ramping the rollers up to about 1,000 feet per minute or more and then back down to about 500 feet per minute or less at least three times per second. A further limitation or disadvantage includes machine wear and tear associated with this repeated high speed acceleration and deceleration.

A further deceleration apparatus utilizes an overhead vacuum to transport the sheet into the hopper area. This machine ramps the speed of the vacuum conveyors down to zero, kicks off the end sheet over the hopper, and then ramps back up to line speed. Although this machine is acceptable at lower speeds, it is anticipated that it would have drive problems at higher speeds.

Accordingly, there is a continuing need in the art for a sheet deceleration apparatus and method which overcomes the limitations in the art and provides a deceleration method and apparatus capable of increasing the stacking capacity of a sheet stacker.

BRIEF SUMMARY OF THE INVENTION

The present disclosure is directed to a sheet deceleration apparatus and method which has particular application for use in a sheet stacking apparatus for stacking sheets of corrugated board, paperboard, fiberboard, or other sheet material from an entry or line conveyor or other delivery means.

In one embodiment, the present disclosure relates to a sheet deceleration apparatus for reducing the speed of a sheet of material moving along a travel path at a first speed. The deceleration apparatus includes a first rotatable roller, being rotatable about a first axis, and positioned on one side of the travel path. A second rotatable roller being rotatable about a second axis is provided on the other side of the travel path and spaced from the first roller so that the sheet of material can pass between the first and second rollers. At least one of the rollers is moveable relative to the other to nip the sheet between the first and second rollers to reduce the travel speed of the sheet. A vacuum conveyor is further provided along the travel path subsequent the first and second rollers to control delivery of the sheet to a stacking hopper. A third rotatable roller, or similar apparatus, may be included in some embodiments, for pushing the sheet of material away from the vacuum conveyor at the appropriate time.

In another embodiment, a method aspect of the present disclosure includes delivering a sheet of material between first and second rollers, rotatable on first and second axes, respectively, delivering the sheet of material to a vacuum conveyor running at a continuous line speed, and driving at least one of the rollers toward the other to nip the sheet of material between the rollers to reduce the speed of the sheet.

In yet another embodiment, the present disclosure relates to a sheet stacking apparatus having an entry conveyor, a stacking hopper, a sheet deceleration apparatus, and an exit conveyor. The entry conveyor delivers sheets of material along a travel path toward a discharge end of the entry conveyor. The stacking hopper is positioned downstream from the entry conveyor. The sheet deceleration apparatus is positioned between the discharge end of the entry conveyor and the stacking hopper. The sheet deceleration apparatus reduces the travel speed of the sheets of material prior to delivery to the stacking hopper. The exit conveyor is positioned at least partially downstream of the sheet deceleration apparatus and controls delivery of the sheets of material to the stacking hopper. The exit conveyor comprises a vacuum, or vacuum conveyor.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

DETAILED DESCRIPTION

The deceleration apparatus and method in accordance with the present disclosure may be used with a sheet stacking machine of the type having an entry conveyor or other sheet delivery means and a stacking hopper. The deceleration apparatus and method and the sheet stacking machine are shown and described with reference to FIGS. 1-10.

Figure 1:
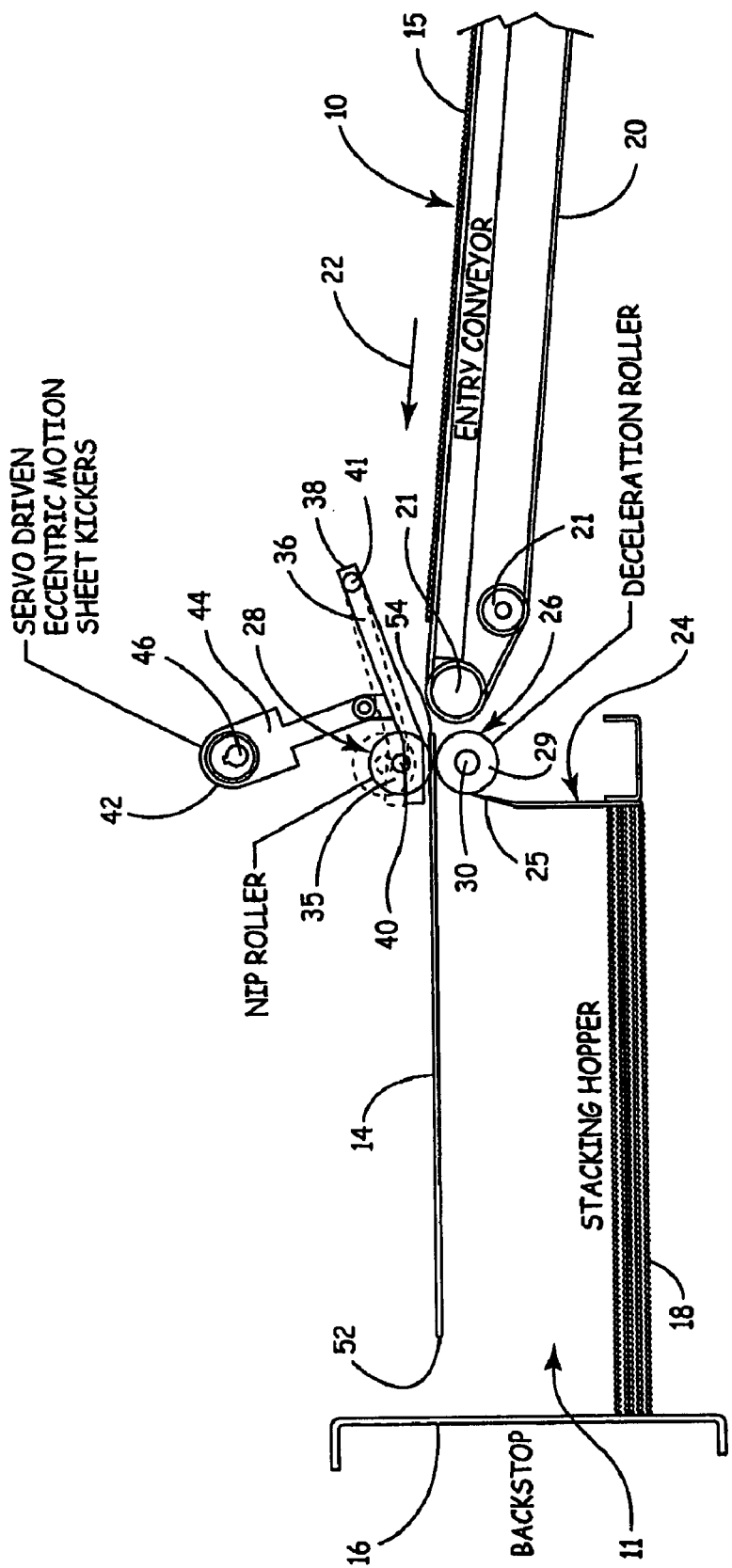
FIG. 1 is an elevational side view of a schematic of a deceleration apparatus in accordance with one embodiment of the present disclosure showing a sheet as it is being decelerated.

With specific reference to FIG. 1, the sheet stacking machine of one embodiment may include an entry conveyor 10 and a stacking hopper 11. During normal operation, a series of sheets 14, 15, etc. may be conveyed by the entry conveyor 10 along a travel path toward the stacking hopper 11. As they reach the discharge end of the entry conveyor 10, the sheets 14, 15, etc. may be projected toward the backstop 16 of the stacking hopper 11. The projected sheets may strike the backstop and fall into the hopper where they accumulate in a stack of sheets 18. The series of sheets 14, 15, etc. may be separated in the direction of movement by a gap. With this structure, the sheets delivered by the entry conveyor 10 may be formed into stacks 18 of sheets for delivery to a site for further processing or storage.

As shown in FIGS. 2-6, the sheets 14, 15, etc. may be comprised of a pair of sheets 14a, 14b and 15a, 15b spaced laterally from one another and being conveyed along the conveyor 10 and through the deceleration mechanism (described below) in a synchronized manner. In other embodiments, it is recognized that the sheets may be comprised of any suitable number of laterally spaced sheets, including one, two, three, four, or more sheets spaced laterally from one another. Each of the sheets 14, 15 (or 14a, 14b, 15a, 15b) may include a leading edge 52 and a trailing edge 54. The leading edge 52 may be the front or leading edge of the sheets as they travel along the conveyor in the direction of the arrow 22 (FIG. 1), while the trailing edge may be the back or trailing edge of the sheets as they travel along the conveyor 10 in the direction of the arrow 22. In FIGS. 1-6, the sheet 14 may be a sheet which has been projected from the conveyor 10.

It will be understood that the stacking machine may be operable up to a certain maximum entry conveyor speed. If the speed of the entry conveyor 10 exceeds the maximum operational speed, the momentum of the sheets that are projected from the end of the conveyor 10, may carry the sheets against the backstop 16 with excessive force. This can cause the sheets to bounce back toward the conveyor, often resulting in the machine being jammed or the sheets being misaligned or skewed in the stack 18. Projecting the sheets at excessive speeds against the backstop 16 can also result in damage to the leading edge of the sheet. This may particularly be the case if the leading edge includes flaps, tabs, or other protrusions. Accordingly, the sheet stacking machine may have a certain maximum operational entry conveyor speed (normally defined in terms of feet per minute and usually about 500 feet per minute for certain sheets) within which the stacking machine is operational for a sheet of a given size.

To improve the capacity of the sheet stacking machine by increasing the speed of the entry conveyor beyond its normal maximum speed, it may be desirable to slow down or decelerate the sheets as they are projected from the entry conveyor to an acceptable speed. This acceptable speed may be a speed which will not cause the sheets to bounce back or result in damage to the leading edges of the projected sheets. The deceleration means, which is the subject of the present disclosure and further details of the sheet stacking machine and system, are described with reference to FIGS. 1-10.

In one embodiment, the entry conveyor 10 may be a belt conveyor. Although the conveyor 10 could comprise a single belt extending across the width of the apparatus, the conveyor 10 of the preferred embodiment may be comprised of a plurality of laterally spaced individual belt conveyors or belt conveyor sections 19. These conveyor sections 19 may be laterally spaced from one another and include an endless belt 20. Each of the belts 20 may be supported by a plurality of belt support rollers 21. At least one of the rollers may be driven to provide the roller 10 with its belt or line speed. The belts 20 may move in unison to convey the sheets 14, 15, etc. along the conveyor and toward the stacking hopper 11 in the direction indicated by the arrow 22 in FIG. 1. The belts 20 may be conventional conveyor belts used in the corrugated, paperboard, or other sheet conveyance industry. Although one embodiment shows a sheet stacking machine comprising endless belts as the entry conveyor and as the means for delivering the sheets to the stacking hopper, other means currently known in the art, or which may be made available in the art, to transport or convey sheets may be used as well. Such other means do not alter the advantageous features of the deceleration apparatus and method of the present disclosure. Such other means may include rollers, overhead or underneath vacuum transport mechanisms, or any other similar conveyance or delivery means. Such other means could also comprise top and bottom belts with the sheets sandwiched between them.

It should be noted that the entry conveyor 10, as shown in FIGS. 2-6, is substantially horizontal as it approaches the stacking hopper. While this may be desirable in some situations, the conveyor 10 may be sloped as shown in FIG. 1 in situations where elevation at the front end of the conveyor is needed.

The stacking hopper 11 may include a backstop 16, which is spaced from the forward end of the entry conveyor 10. The distance of this spacing may be adjustable to accommodate sheets of different lengths and may be at least as great as the length of the sheets (measured in the direction of travel) being stacked. The stacking hopper 11 may also include a back tamper 24 extending generally parallel to the backstop 16. As shown, the back tamper may include a generally vertical wall portion and an upper edge 25, which is sloped toward the entry conveyor 10. This sloping edge 25 may assist in guiding the projected sheets into the stacking hopper 11 between the backstop 16 and the back tamper 24. This back tamper may be of a conventional design and include means to square the stack 18 and to repeatedly tamp the rear edges of the sheets in the stack toward the backstop 16 to keep the stack 18 square during the stacking process. The stacking hopper 11 may also be provided with one or more side tampers and a divider if multiple side-by-side sheets are being stacked. In one embodiment, the back tamper may be spaced from the entry conveyor 10 a sufficient distance to accommodate the sheet deceleration apparatus of the present disclosure.

The sheet deceleration apparatus of the present disclosure may include a first or deceleration roller means or assembly 26 and a second or nip roller means or assembly 28. As shown, the roller means 26 may be positioned below or on one side of the sheet travel path, while the roller means 28 may be positioned above or on the other side of the sheet travel path. These roller means 26 and 28 may be designed for reciprocal movement toward and away from one another to temporarily nip or capture a projected sheet to slow down or decelerate the forward travel speed of that sheet. This may permit the entry conveyor 10 to travel at an increased speed, while at the same time preventing the sheets from being projected against the backstop at excessive speeds that would cause the sheets to bounce back or damage to the leading edge of the sheets.

The deceleration roller assembly 26 may include a plurality of deceleration rollers 29 positioned on one side of the projected sheet 14. In one embodiment, the rollers 29 may be mounted on a common rotation shaft 30 and spaced from one another laterally across the width of the entry conveyor 10. The shaft 30, and thus the rotation axis of the rollers 29, may be generally perpendicular to the travel path of the sheets. As shown best in FIG. 1, the rollers 29 may be positioned at the forward end of the entry conveyor 10. The rollers 29 may be spaced slightly in front of the forward end of the entry conveyor 10, with the top of the rollers 29 being at or slightly below the conveying level of the conveyor 10. In a further embodiment, the top of the rollers 29 may be slightly below the conveying level of the conveyor 10 (the sheet travel path). This may result in the projected sheet dropping slightly as it is engaged by the nip roller (discussed below) and may eliminate or minimize interference by the leading edge of the following sheet.

The rollers 29 may also be positioned slightly rearwardly of the back tamper 24. This may permit the projected sheets to fall within the stacking hopper 11 without interference from the rollers 29. The rollers 29 may be mounted to the common shaft 30 for rotation with the shaft 30. In one embodiment, the shaft 30, and thus the rollers 29, may be driven, although some advantages of the present invention may be achieved with rollers 29 which are free spooled or which are provided with a specified rotational resistance. The rollers may be driven at a rotational speed such that the circumferential speed of the outer surface of the rollers 29 travels in the same direction as the travel direction 22 of the conveyor 10, but at a reduced speed. The rotational speed of the shaft 30 and rollers 29, and thus the degree of deceleration, may be adjusted so that the circumferential speed of the rollers is about one-half to one-fourth the linear speed of the conveyor 10 or less. However, the degree of deceleration can be any fraction (less than one) of the line speed of the conveyor 10.

As shown best in FIGS. 2-6, the sloping wall section 25 of the back tamper 24 may be provided with a plurality of cutout portions or recesses 31 to accommodate nesting of the rollers in those recesses. These recesses 31 may be aligned with the rollers 29 and may permit the tamping movement of the tamper 24 without interference between the wall 25 and the rollers 29.

Figure 2:
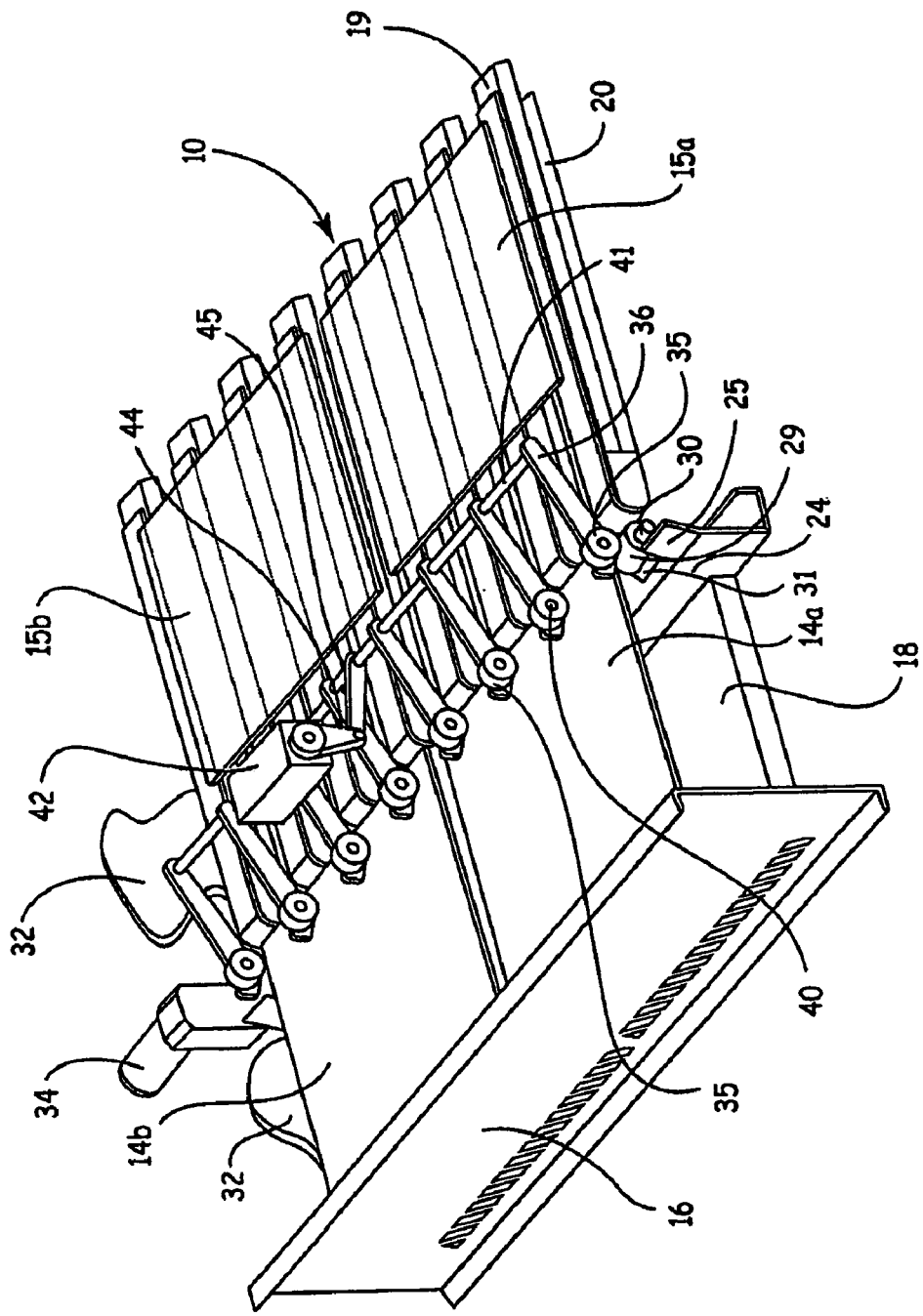
FIG. 2 is an isometric view of the deceleration apparatus in accordance with one embodiment of the present disclosure.
Figure 3:
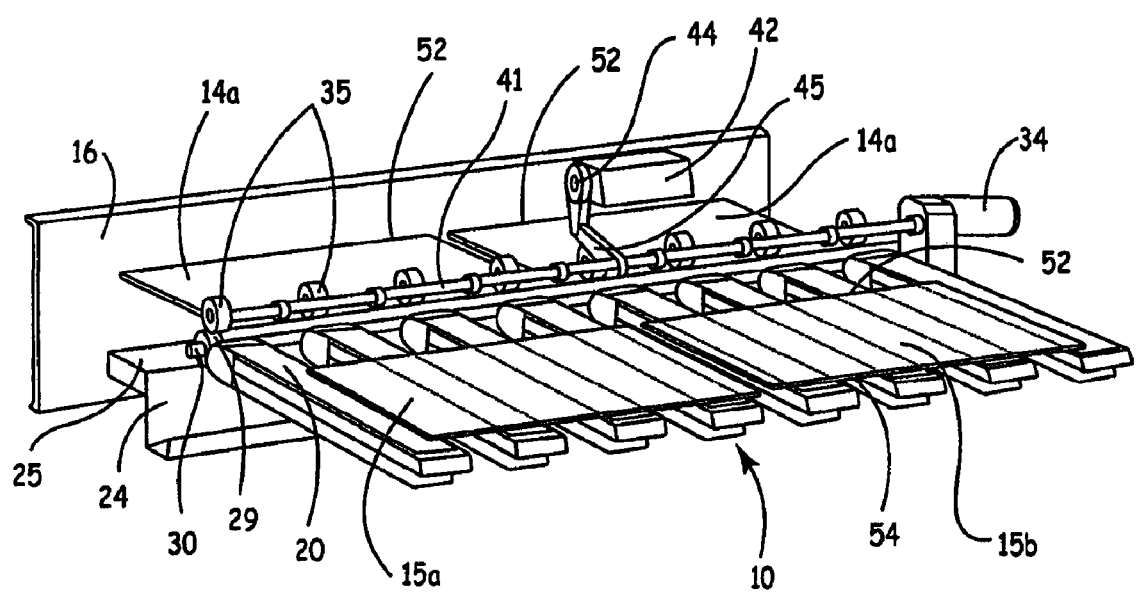
FIG. 3 is a further isometric view of the deceleration apparatus in accordance with one embodiment of the present disclosure.
Figure 4:
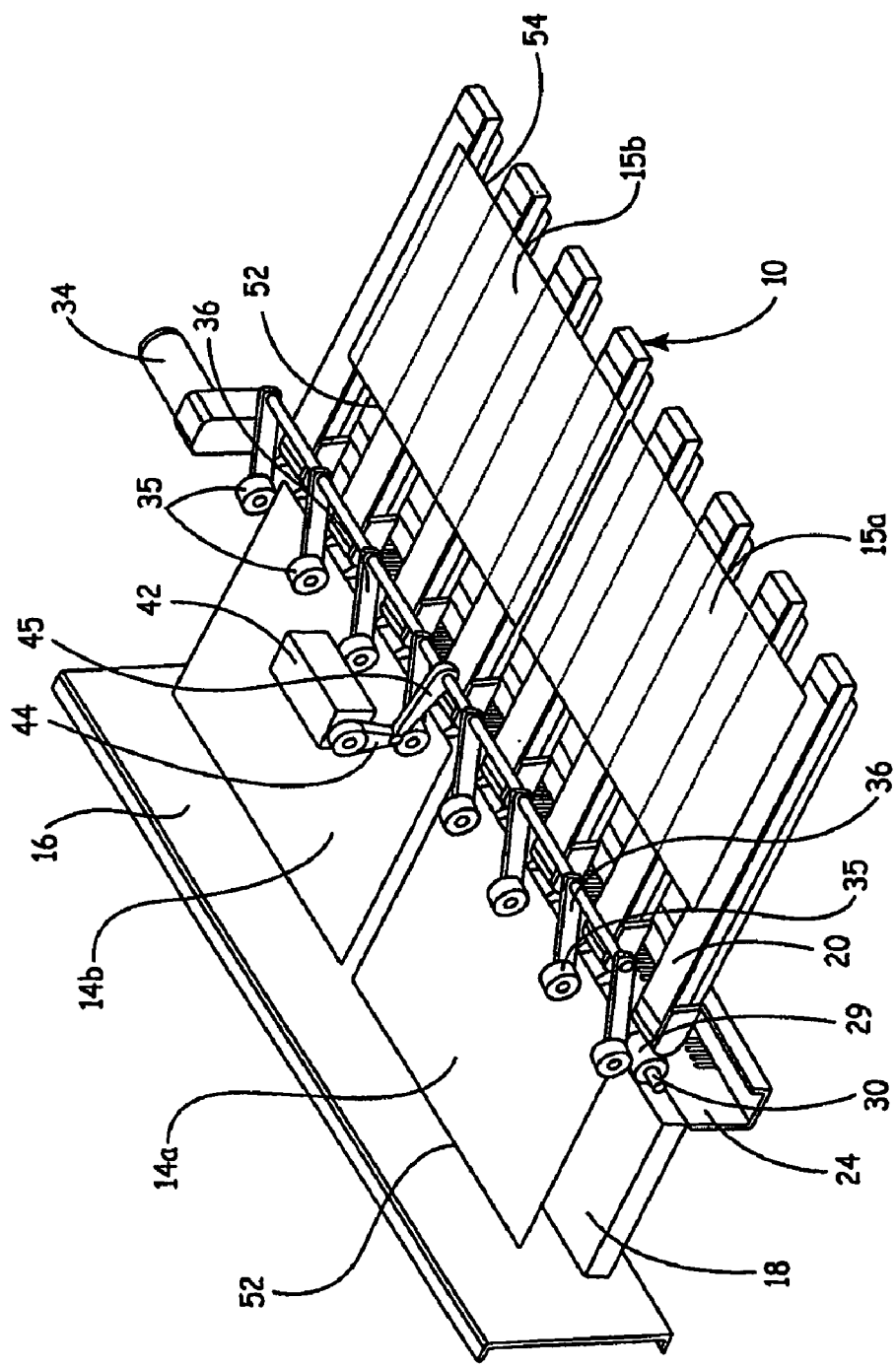
FIG. 4 is a still further isometric view of the deceleration apparatus in accordance with one embodiment of the present disclosure.
Figure 5:
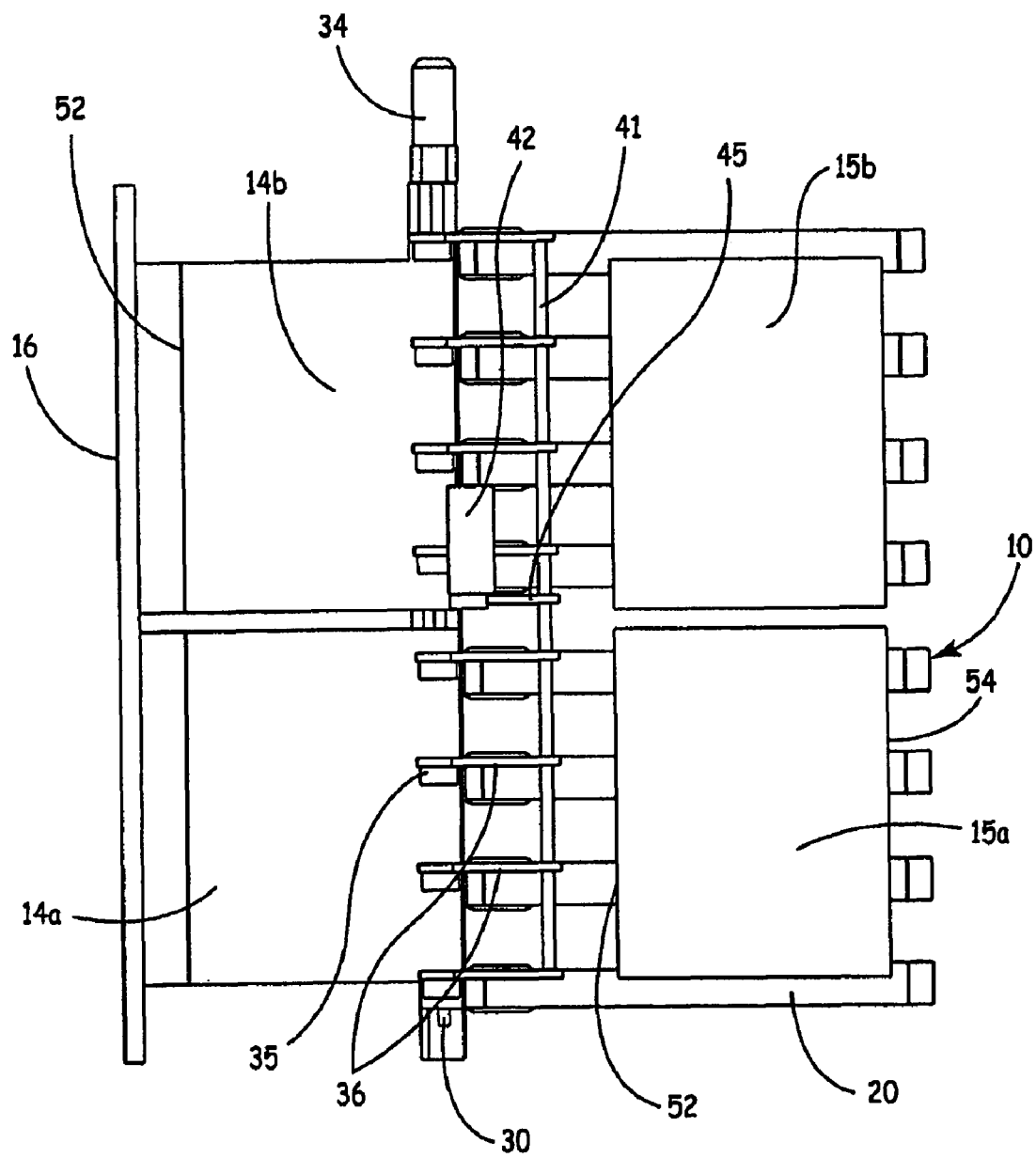
FIG. 5 is an elevational plan view of the deceleration apparatus in accordance with one embodiment of the present disclosure.
Figure 6:
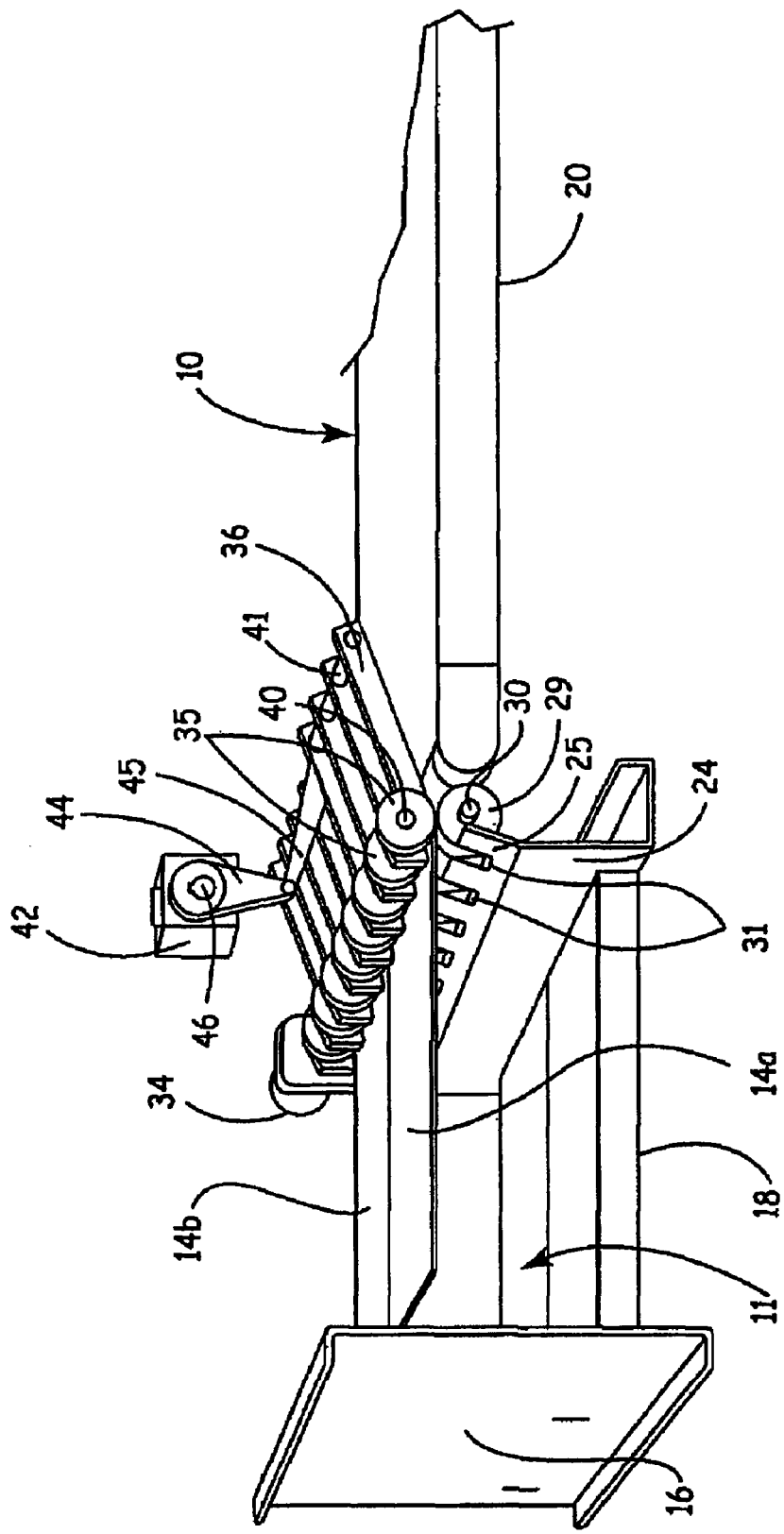
FIG. 6 is a further isometric view of the deceleration apparatus in accordance with one embodiment of the present disclosure.
Figure 7:
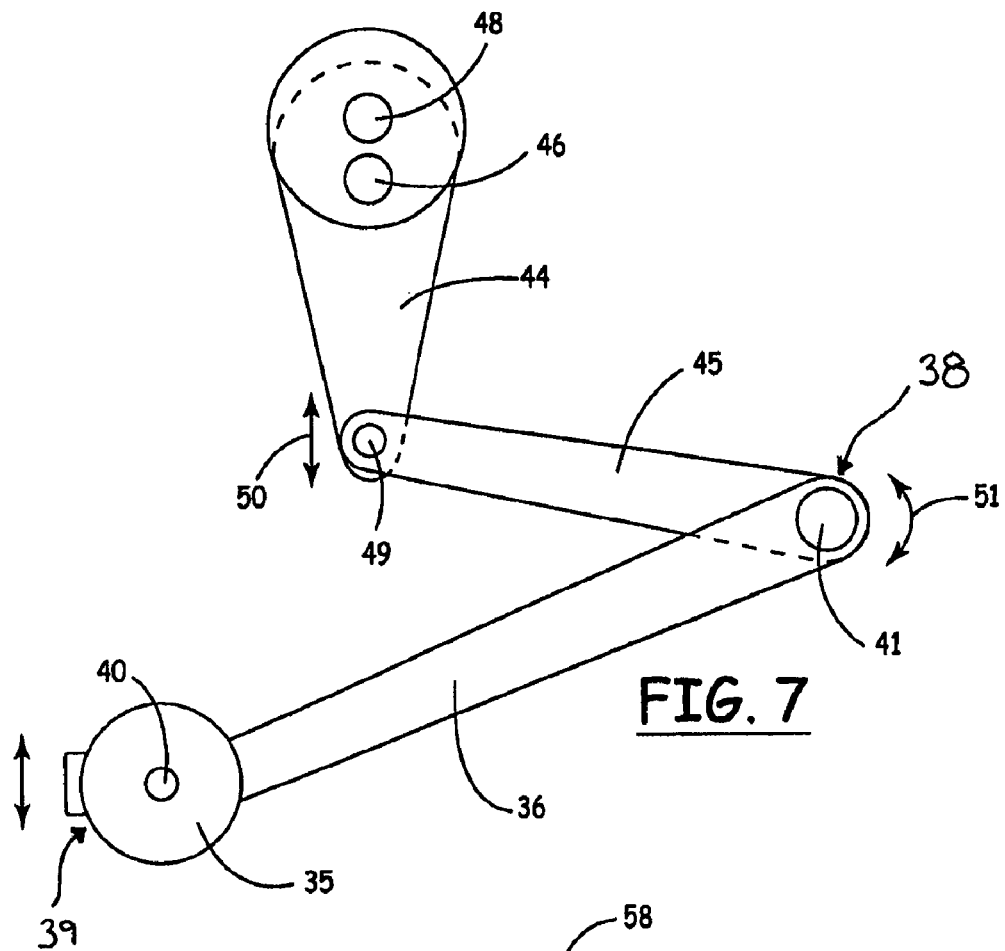
FIG. 7 is an enlarged view of a mechanism for driving the nip rollers in accordance with one embodiment of the present disclosure.

The shaft 30 and thus the rollers 29 may be rotatably supported in a portion of the apparatus of frame 32 (FIG. 2). This position of the shaft 30 relative to the apparatus frame 32 may be spatially fixed during an operational mode. It is also contemplated, however, that means may be provided, if desired, to adjust the vertical and lateral position of the shaft 30 and thus the rollers 29 relative to the forward end of the entry conveyor 10. The shaft 30 and thus the rollers 29 may be driven by a deceleration roller motor 34. In one embodiment, this motor 34 may be a variable speed or variable frequency motor designed to run at a plurality of adjustable constant speeds. These speeds may be sufficient to rotate the rollers 29 at a circumferential speed (feet per minute) less than the linear speed at which the sheets are traveling on the conveyor 10.

The rollers 29 can be made from a variety of materials. In one embodiment, these may include aluminum or aluminum with a urethane coating. Various plastics and other materials may be used as well.

The nip roller assembly 28 may include a plurality of individual rollers 35. As shown, these rollers 35 may be laterally spaced across the width of the entry conveyor 10, with such spacing approximating the spacing of the rollers 29. Accordingly, each of the rollers 29, in one embodiment, may include an associated or complimentary nip roller 35. The rollers 35 may be what are known in the art as zero crush rollers. These are rollers which have a circumferential configuration which eliminates or minimizes any damage to the sheet as it is engaged by the rollers 35.

Each of the nip rollers 35 may be designed for reciprocal movement toward and away from its associated deceleration roller 29 so as to capture or nip a projected sheet. A variety of structural mechanisms may be designed to provide such relative movement. In one embodiment, this reciprocal movement may be provided by a nip roller pivot arm or link 36 associated with each of the rollers 35. Each of these pivot arms 36 may include a rotation end 38 and an opposite free end 39. The nip rollers 35 may be rotatably connected near the free ends 39 of the pivot arms 36 about the pivot axis or shaft 40. These pivot arms or shafts 40 may be generally perpendicular to the travel path of the sheets. The rotation ends 38 of the pivot arms 36 may be rigidly mounted to the pivot shaft 41 in such a manner that pivotal movement of the shaft 41 results in corresponding movement of the pivot arm 36. In one embodiment, the shaft 41 may be common to all of the pivot arms 36 and is mounted for limited pivotal movement within a portion of the apparatus frame 32.

The pivot shaft 41 may be connected with, and driven by a servo motor 42 through a pair of drive links 44 and 45. As shown more specifically in FIG. 7, the drive link 44 may include a first end, which is rotatably connected with an eccentric shaft 46, which is eccentric to the servo motor output shaft 48. The opposite or free end of the drive link 44 may be pivotally connected with a free end of the drive link 45 about the pivot 49. The opposite end of the drive link 45 may be rigidly secured to the pivot shaft 41 so that movement of the drive link 45 results in corresponding pivotal movement of the pivot shaft 41. Accordingly, as the output shaft 48 of the servo motor 42 rotates, the eccentric shaft 46 may revolve around the shaft 48 and provide a reciprocal movement to the pivot 49 joining the links 44 and 45 in the direction of the arrow 50. This may result in corresponding reciprocal pivotal movement of the pivot shaft 41 in the direction of the arrow 51. Reciprocal pivotal movement of the shaft 41 may result in corresponding pivotal movement of the pivot arms 36, and thus reciprocal movement of the nip rollers 35 toward and away from the deceleration rollers 29.

The servo motor 42 may be a conventional servo motor, which is synchronized with the speed of the entry conveyor 10, the press, and other components of the conveyance and processing system. The function of the synchronized servo motor may be to ensure that the reciprocal movement of the nip rollers 35 toward and away from the deceleration rollers 29 engage or nip the projected sheet at the desired point in time (relative to the projected sheet 14) and for the desired length of time to decelerate the sheet from the line speed of the conveyor 10 to a desired lower speed.

Figure 8:
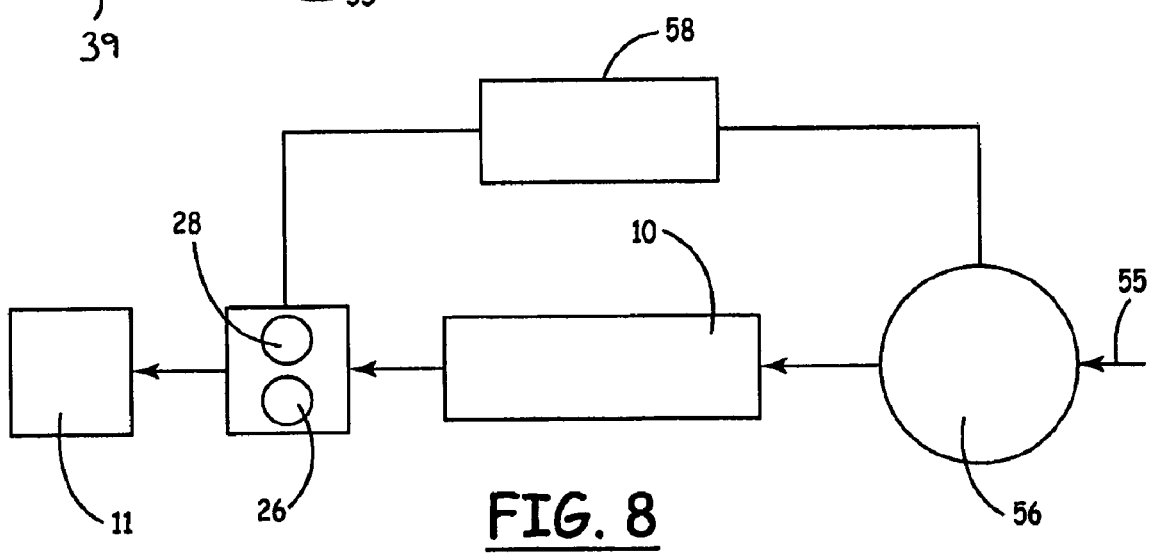
FIG. 8 is a schematic flow diagram showing a sheet formation, delivery, deceleration and stacking system utilizing the deceleration apparatus in accordance with one embodiment of the present disclosure.

A system in which the deceleration apparatus and method of the present invention has particular application is illustrated schematically in FIG. 8. In such system, corrugated or other sheets of material may be cut from a web 55 of material by a rotary press or drum 56. Depending upon the length of the sheets, one revolution of the drum 56 conventionally may cut out three or six sheets (or more or less for specialty systems). In general, the sheets may be as long as 60 inches or more or as short as 20 inches or less. These sheets may be delivered to the entry conveyor 10 described above. The entry conveyor 10 may then deliver the sheets, with gaps between the trailing edge of one sheet and the leading edge of an adjacent following sheet to the deceleration apparatus comprised of the roller assemblies 26 and 28 as described above. The deceleration apparatus may reduce the speed of the sheets and deliver the sheets to the hopper 11. In one embodiment, the servo motor 42 which drives the reciprocal movement of the nip roller assembly 28 may be synchronized with the conveyor 10 and the press 56 via an encoder associated with the drum 56 and the control 58. Because three, or six, or any other fixed number of sheets may be cut out and transferred to the conveyor 10 during each rotation of the drum 56, the rotation of the servo motor 42 can be timed via an encoder associated with the drum 56 so that the motor 42 will correspondingly rotate three, six, or any such other fixed number of times during each rotation of the drum 56. To control the specific time at which rotation of the servo motor 42 is actuated, a phase shift may be utilized. Through this phase shift, the specific time at which the output shaft of the servo motor 42 is rotated, and thus the time at which the nip rollers 35 move toward the rollers 29 to engage the projected sheet 14, may be controlled. Because the finishing machine or the drum 56 registers the leading edge of each sheet, and because movement of the nip roller 35 and thus actuation of the servo motor 42 may be registered with respect to the trailing edge of each sheet, the primary input to the controller 58 may be the length of the sheet. From this input, the phase shift can be calculated so that the nip rollers 35 will move toward the rollers 29 and engage the projected sheet 14 shortly before its trailing edge. This engagement of the projected sheet by the rollers 35 and 29 may occur as close to the trailing edge of the projected sheet as possible, including within one or two inches.

When actuated, the output shaft 48 of the servo motor 42 can be programmed or designed to exhibit a variety of profiles. One such profile may be a continuous and relatively constant rotational profile in which the output shaft 48 rotates continuously at a relatively constant speed. A second profile may be one in which the shaft 48 is ramped up and then down through 180° to a stop position and after stopping for a predetermined period of time, ramping up and then down through 180° to a further stop position. A third profile may be a sinusoidal or other profile in which the rotation of the shaft 48 ramps up to a high speed where the rollers 35 engage and nip the projected sheet against the rollers 29 and then ramp back down to a slow rotational speed as the nip rollers 35 are released. Rotation of the shaft 48 of the servo motor 42 exhibiting a sinusoidal profile may be desirable since it appears to provide the smoothest motion.

In one embodiment of the sheet stacking machine in accordance with the present disclosure, an overhead vacuum conveyor 60 may be used to convey the sheets, 14, 15, etc. over the stacking hopper 11 and over the stack 18. The overhead vacuum conveyor 60 may be separate from the deceleration roller assembly 26 and nip roller assembly 28. Unlike prior art deceleration machines having a vacuum conveyor, in one embodiment of the deceleration apparatus in accordance with the present disclosure, the speed of the overhead vacuum conveyor 60 need not be ramped down to zero and subsequently ramped back up to line speed. The overhead vacuum conveyor 60 may be continuously run at line speed.

The overhead vacuum conveyor 60 may comprise one or more vacuums 62, which may operate to retain the sheets 14, 15, etc. against the overhead vacuum conveyor 60. In one embodiment, the overhead vacuum conveyor 60 may be a belt conveyor. Similar to conveyor 10, the overhead vacuum conveyor 60 could comprise a single belt extending across the width of the apparatus. However, the overhead vacuum conveyor 60 may be comprised of a plurality of laterally spaced individual belt conveyors or belt conveyor sections. These conveyor sections may be laterally spaced from one another and include an endless belt. Each of the belts may be supported by a plurality of belt support rollers. At least one of the rollers may be driven to provide the roller with its belt or line speed. The belts may move in unison to convey the sheets 14, 15, etc. along the overhead vacuum conveyor 60 and toward the stacking hopper 11 in the direction indicated by the arrow 64 in FIG. 9. The belts may be conventional conveyor belts used in the corrugated, paperboard, or other sheet conveyance industry.

Figure 9:
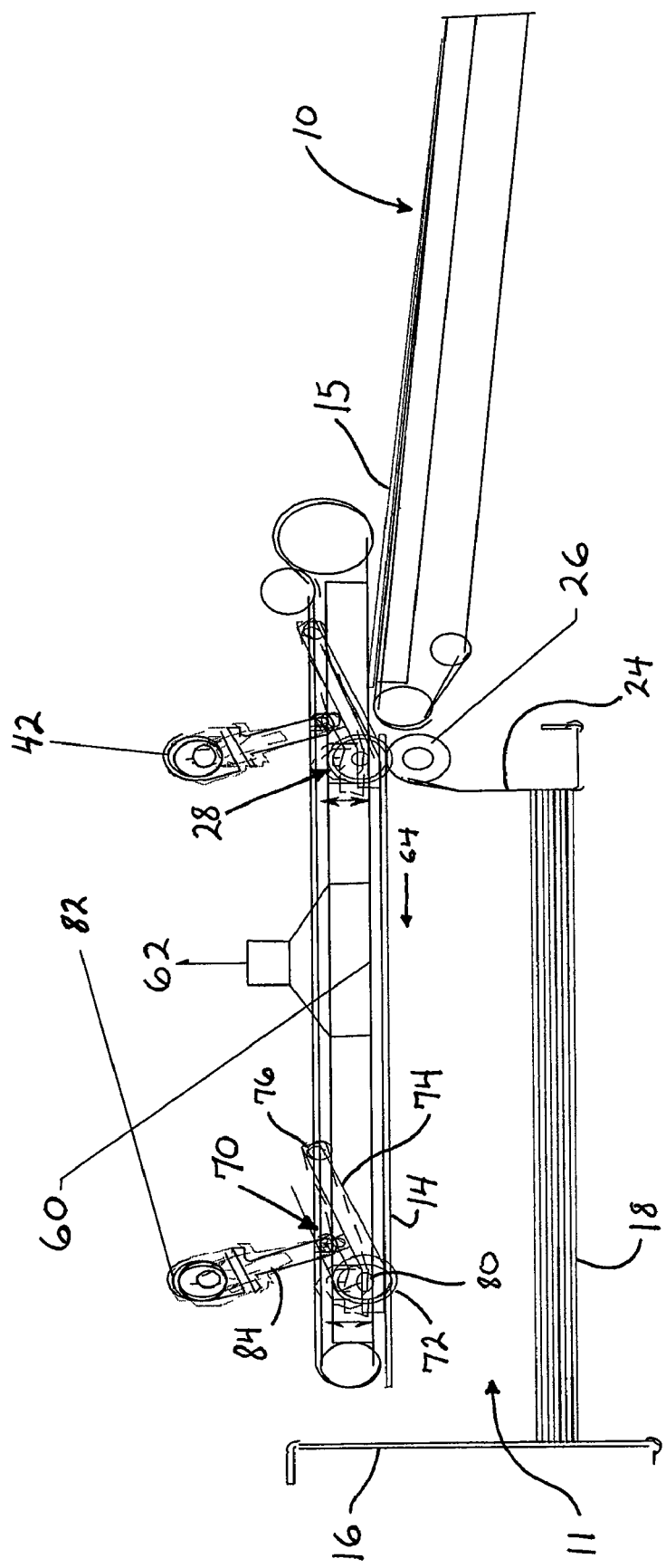
FIG. 9 is an elevational side view of a schematic of a deceleration apparatus in accordance with another embodiment of the present disclosure showing a sheet as it is being decelerated.

It should be noted that the overhead vacuum conveyor 60, as shown in FIG. 9, is substantially horizontal as it approaches the stacking hopper 11. While this may be desirable in some situations, the overhead vacuum conveyor 60 may be sloped in situations where elevation at one end of the conveyor is desired.

In a further embodiment, a second nip roller assembly, or sheet kicker assembly 70, may be used to push, or kick, the sheets 14, 15, etc. off of the overhead vacuum conveyor 60. In one embodiment, the sheet kicker assembly 70 may kick the sheets 14, 15, etc. off of the overhead vacuum conveyor 60 at substantially the same time the trailing edge of the sheets 14, 15, etc. are nipped by the nip roller assembly 28.

In one embodiment, the sheet kicker assembly 70 may be similar to the nip roller assembly 28. Although one embodiment of the sheet kicker assembly is illustrated as being similar to the nip roller assembly 28, other means currently known in the art, or which may be made available in the art, to push, or kick, the sheets 14, 15, etc. off of the overhead vacuum conveyor 60 may be used as well. Such other means do not alter the advantageous features of the deceleration apparatus and method of the present disclosure. Such other means may include air pressure (e.g., air bursts), vacuum suction (e.g., in a reverse direction than the vacuum conveyor), or any other similar means for pushing the sheets away from the overhead vacuum conveyor 60.

As illustrated, the sheet kicker assembly 70 may include a plurality of individual rollers 72. These rollers 72 may be laterally spaced across the width of the overhead vacuum conveyor 60. In one embodiment, the rollers 72 may be laterally spaced such that the spacing approximates the spacing of the rollers 35 of the nip roller assembly 28. However, the rollers 72 may be laterally spaced in any suitable configuration. The rollers 72 may be zero crush rollers so as to eliminate or minimize any damage to the sheets as they are engaged by the rollers 72.

Figure 10:
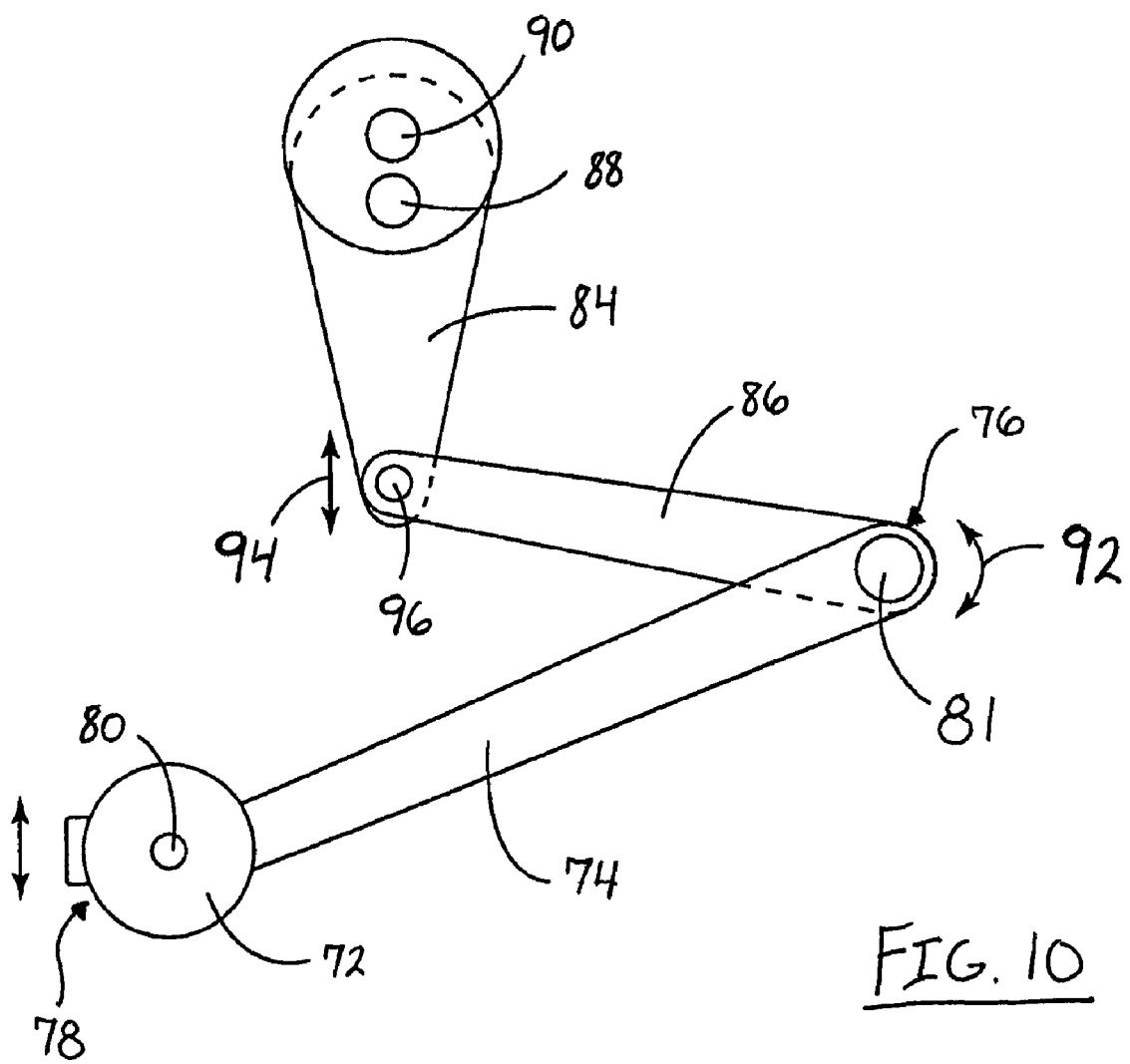
FIG. 10 is an enlarged view of a mechanism for driving the rollers of the sheet kicker assembly in accordance with another embodiment of the present disclosure.

Each of the rollers 72 may be designed for reciprocal movement toward and away from the sheets 14, 15, etc. as they are conveyed over the stacking hopper 11 by the overhead vacuum conveyor 60. A variety of structural mechanisms may be designed to provide such relative movement. In one embodiment, this reciprocal movement may be provided by a kicker roller pivot arm or link 74 associated with each of the rollers 72. Each of these pivot arms 74 may include a rotation end 76 and an opposite free end 78 (FIG. 10). The rollers 72 may be rotatably connected near the free ends 78 of the pivot arms 74 about the pivot axis or shaft 80. These pivot arms or shafts 80 may be generally perpendicular to the travel path of the sheets 14, 15, etc. The rotation ends 76 of the pivot arms 74 may be rigidly mounted to the pivot shaft 81 in such a manner that pivotal movement of the shaft 81 results in corresponding movement of the pivot arm 74. In a further embodiment, the shaft 81 may be common to all of the pivot arms 74.

In one embodiment, the pivot shaft 81 may be connected with, and driven by a servo motor 82 through a pair of drive links 84 and 86 (FIG. 10). As shown more specifically in FIG. 10, the drive link 84 may include a first end, which is rotatably connected with an eccentric shaft 88, which is eccentric to the servo motor output shaft 90. The opposite or free end of the drive link 84 may be pivotally connected with a free end of the drive link 86 about the pivot 96. The opposite end of the drive link 86 may be rigidly secured to the pivot shaft 81 so that movement of the drive link 86 results in corresponding pivotal movement of the pivot shaft 81. Accordingly, as the output shaft 90 of the servo motor 82 rotates, the eccentric shaft 88 may revolve around the shaft 90 and provide a reciprocal movement to the pivot 96 joining the links 84 and 86 in the direction of the arrow 94. This may result in corresponding reciprocal pivotal movement of the pivot shaft 81 in the direction of the arrow 92. Reciprocal pivotal movement of the shaft 81 may result in corresponding pivotal movement of the pivot arms 74, and thus reciprocal movement of the rollers 72 toward and away from the sheets 14, 15, etc.

The servo motor 82 may be a conventional servo motor, which is synchronized with the speed of the servo motor 42, and therefore, entry conveyor 10, the press, and other components of the conveyance and processing system. The function of the synchronized servo motor 82 may be to ensure that the reciprocal movement of the rollers 72 toward and away from the sheets 14, 15, etc. engage or kick the sheets at the desired point in time and for the desired length of time to push the sheets 14, 15, etc. off of the overhead vacuum conveyor 60 at approximately the time the sheets 14, 15, etc. are decelerated from the line speed of the conveyor 10 to a desired lower speed by the nip roller assembly 28.

In one embodiment, sheet kicker assembly 70 may be operably independent from the nip roller assembly 28. However, the sheet kicker assembly 70 may be synchronized with the nip roller assembly 28 such that the sheet kicker assembly 70 kicks the sheets at the desired point in time to push the sheets off of the overhead vacuum conveyor 60 at approximately the time the sheets are decelerated by the nip roller assembly 28.

Figure 11:
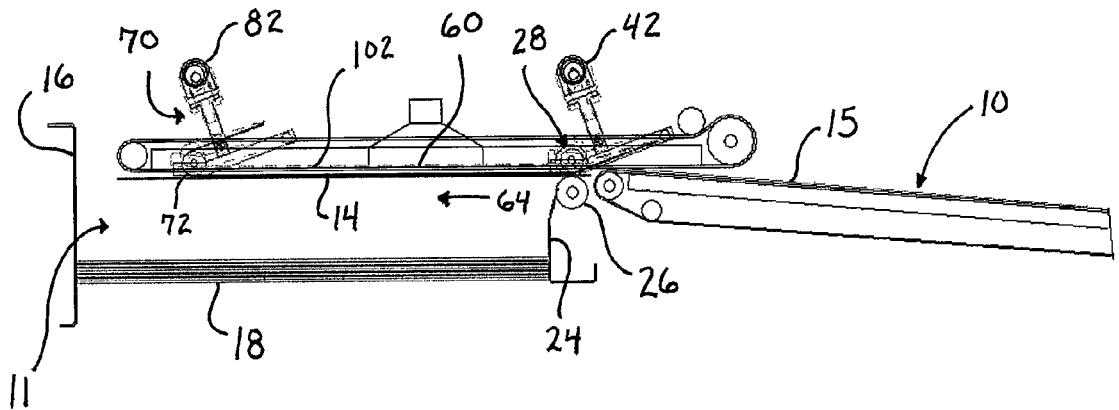
FIG. 11 is an elevational side view of a schematic of a deceleration apparatus in accordance with a further embodiment of the present disclosure having a belt, chain, or the like tensioned between the kicker assembly and the nip roller assembly.

In a further embodiment, illustrated in FIG. 11, a belt, chain, or the like 102 may be tensioned between the kicker assembly 70 and the nip roller assembly 28 for assisting the kicker assembly 70 in kicking the sheets 14, 15, etc. off of the overhead vacuum conveyor 60. Particularly, a belt, chain, or the like 102 may be tensioned between the rollers 72 of the kicker assembly 70 and the nip rollers 35 of the nip roller assembly 28. As such, the sheets 14, 15, etc. are pushed from the vacuum conveyor 60 along more surface area of the sheets 14, 15, etc.

Figure 12:
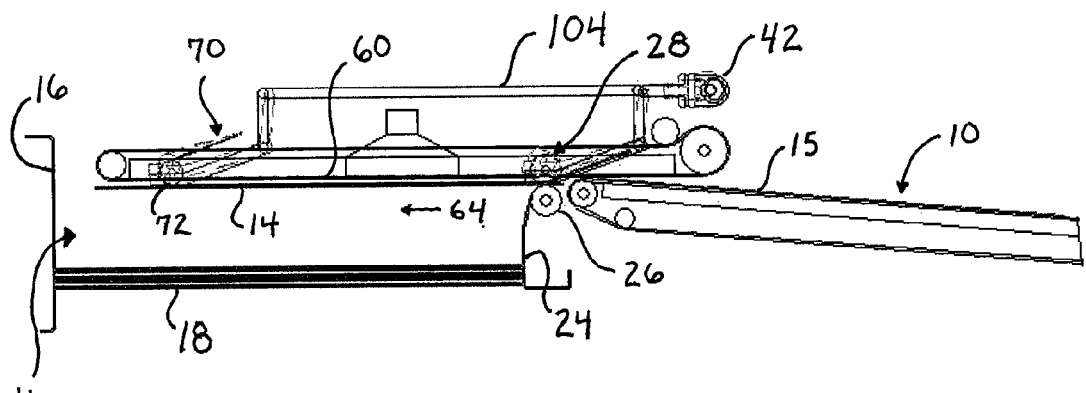
FIG. 12 is an elevational side view of a schematic of a deceleration apparatus in accordance with yet a further embodiment of the present disclosure, wherein the sheet kicker assembly is operably connected to the nip roller assembly.

In alternate embodiments, such as that illustrated in FIG. 12, the sheet kicker assembly 70 may be operably connected to the nip roller assembly 28. For example, the sheet kicker assembly 70 and nip roller assembly 28 may be run using a single servo motor 42 and may be connected by link, chain, belt, gears, or other method 104 of operably connecting the sheet kicker assembly 70 and nip roller assembly 28. Thus, the sheet kicker assembly 70 and nip roller assembly 28 may be generally synchronized such that the sheet kicker assembly 70 kicks the sheets at the desired point in time to push the sheets off of the overhead vacuum conveyor 60 at approximately the time the sheets are decelerated by the nip roller assembly 28.

Figure 13:
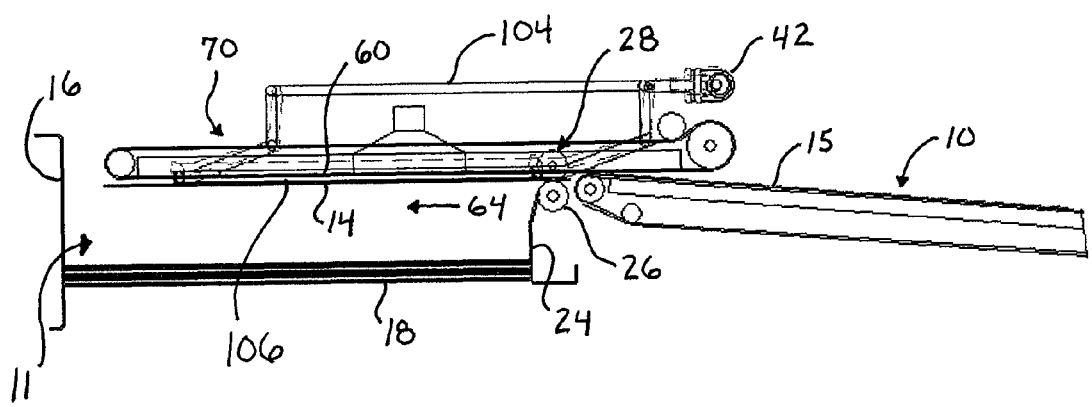
FIG. 13 is an elevational side view of a schematic of a deceleration apparatus in accordance with another embodiment of the present disclosure having a bar, or other similar mechanism, extending between the kicker assembly and the nip roller assembly for assisting the kicker assembly in kicking the sheets off of the overhead vacuum conveyor, and the sheet kicker assembly is operably connected to the nip roller assembly.

FIG. 13 illustrates another embodiment, generally combining the embodiments of FIGS. 11 and 12, wherein a bar 106, or other similar mechanism, may extend between the kicker assembly 70 and the nip roller assembly 28 for assisting the kicker assembly 70 in kicking the sheets 14, 15, etc. off of the overhead vacuum conveyor 60, and the sheet kicker assembly 70 and nip roller assembly 28 may be run using a single servo motor 42 by connecting them by link, chain, belt, gears, or other method 104, as described above.

Figure 14:
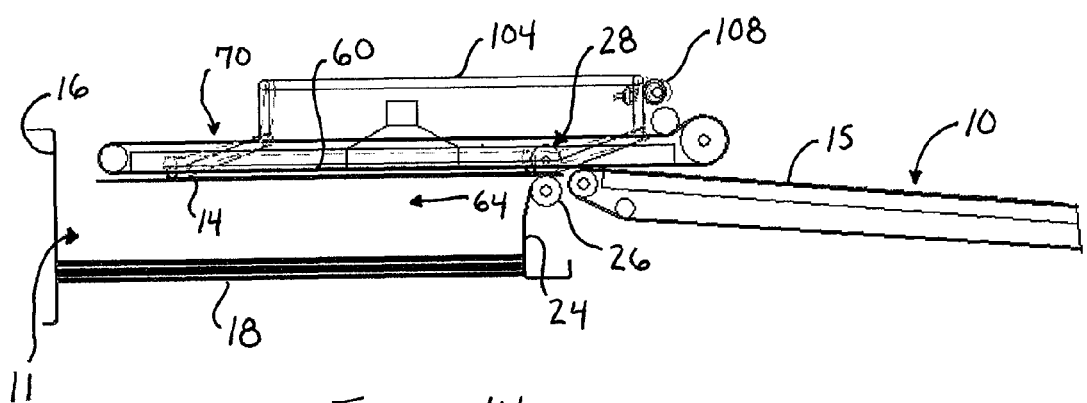
FIG. 14 is an elevational side view of a schematic of a deceleration apparatus in accordance with still another embodiment of the present disclosure having an eccentric roller for reciprocating the movement of the kicker assembly.

In yet another embodiment, illustrated in FIG. 14, an eccentric roller 108 or other device providing a constant reciprocal movement of the nip roller assembly 28 and/or kicker assembly 70 may be used in place of the servo motor 42.

The overhead vacuum conveyor 60 and/or sheet kicker assembly 70 may provide additional control of the sheets 14, 15, etc. while being conveyed to the stacking hopper 11. For example, the overhead vacuum conveyor 60 and/or sheet kicker assembly 70 may provide additional control to transfer the sheets 14, 15, etc. to the stacking hopper 11 in a generally horizontal manner. Similarly, the overhead vacuum conveyor 60 and/or sheet kicker assembly 70 may keep subsequent incoming sheets away from the previous sheet, as the incoming sheet enters the deceleration apparatus in accordance with the present disclosure.

Having described the structural details of the deceleration apparatus in accordance with the present disclosure, the operation of that apparatus and the method aspect of the present disclosure can be understood and described as follows. During normal operation, a linear series of sheets, 14, 15, etc. may travel along the entry conveyor 10 (or otherwise be delivered at line speed) in the direction of the arrow 22. These sheets may include a gap between the trailing edge of one sheet and the leading edge of the adjacent following sheet. Because of the speed at which the conveyor 10 is moving, each sheet that reaches the end of the conveyor may be projected off the conveyor toward the backstop 16. Shortly before the leading edge of the projected sheet 14 reaches the backstop 16, the nip rollers 35 may be moved downwardly toward the deceleration rollers 29 via the servo motor 42 and the drive and pivot link assembly. This movement of the nip rollers 35 toward the deceleration rollers 29 may nip or capture the sheet between the rollers. This movement of the nip rollers 35 toward the deceleration rollers 29 may be at a point in time relative to the projected sheet where it nips or captures the projected sheet near its trailing edge or as close to its trailing edge as possible. When the sheet is nipped or captured between the nip and deceleration rollers, the speed of the sheet may be reduced to a speed approximating that of the deceleration roller. This may be a speed that is less than the line speed of the entry conveyor 10.

In an embodiment comprising an overhead vacuum conveyor 60 and sheet kicker assembly 70, operation of the deceleration apparatus and the method aspect of the present disclosure can be understood and described as follows. During normal operation, a linear series of sheets, 14, 15, etc. may travel along the entry conveyor 10 (or otherwise be delivered at line speed) in the direction of the arrow 22. These sheets may include a gap between the trailing edge of one sheet and the leading edge of the adjacent following sheet. Because of the speed at which the conveyor 10 is moving, each sheet that reaches the end of the conveyor may be projected off the conveyor toward the backstop 16. The overhead vacuum conveyor 60 may retain each sheet generally parallel to the stacking hopper 11 as the sheet is projected toward the backstop 16. The overhead vacuum conveyor 60 may run continuously at substantially line speed. Shortly before the leading edge of the projected sheet 14 reaches the backstop 16, the nip rollers 35 may be moved downwardly toward the deceleration rollers 29 via the servo motor 42 and the corresponding drive and pivot link assembly. This movement of the nip rollers 35 toward the deceleration rollers 29 may nip or capture the sheet between the rollers. This movement of the nip rollers 35 toward the deceleration rollers 29 may be at a point in time relative to the projected sheet where it nips or captures the projected sheet near its trailing edge or as close to its trailing edge as possible. When the sheet is nipped or captured between the nip and deceleration rollers, the speed of the sheet may be reduced to a speed approximating that of the deceleration roller. This may be a speed that is less than the line speed of the entry conveyor 10. At substantially the same time the nip rollers 35 are moved downwardly toward the deceleration rollers 29, the rollers 72 of the sheet kicker assembly 70 may be moved downwardly toward the sheet via servo motor 82 and the corresponding drive and pivot link assembly (or via servo motor 42 using a suitable link, chain, belt, gears, etc. as described previously). This movement of the rollers 72 toward the sheet may be at a point in time relative to the projected sheet where it pushes, or kicks, the projected sheet near its leading edge or closer to the leading edge than the location on the sheet where the nip rollers 35 nip the projected sheet to decelerate the sheet.

After a short period of time, which may be dependent on the rotation profile of the servo motor 42, among other factors, the nip roller may be moved away from the deceleration roller, thereby allowing the sheet to continue to travel in the forward direction, but at a reduced speed, into the stacking hopper 11. The extent to which the speed of the sheet is reduced may depend on the speed of the entry conveyor 10, the speed of the deceleration rollers 29, and the size of the sheets, among other factors.

Although some embodiments contemplate a servo motor 42 which is synchronized with the speed of the conveyor 10 and the rotation of the drum 56 as described above, photodetectors or other position detecting means can be utilized to identify or detect the particular position or location of an advancing sheet and trigger the actuation of the servo motor 42 at the desired point in time. Similarly, photodetectors or other position detecting means can be utilized to identify or detect the particular position or location of an advancing sheet and trigger the actuation of the servo motor 82 at the desired point in time for the sheet kicker assembly 70.

Also, although the deceleration rollers 29 may be spatially fixed relative to the apparatus frame 32, with the nip rollers 35 moving in reciprocal relationship toward and away from the deceleration rollers 29, the reverse could be provided without deviating from the spirit of the present disclosure. For example, the nip rollers 35 could be spatially fixed relative to the apparatus frame 32 and the deceleration rollers could be reciprocally moved toward and away from the nip rollers. It is also possible and contemplated by the present disclosure that both the nip rollers 35, as well as the deceleration rollers 29 could be moved toward one another relative to the apparatus frame 32.

In one embodiment the present disclosure contemplates that the nip rollers 35 could, like the deceleration rollers 29, be driven. However, the nip rollers 35, in other embodiments, may not be driven and may be permitted to free spool and thus assume the speed of the sheet as the nip and deceleration rollers nip or capture the moving sheet.

Although the modified embodiments have been specifically described, it is contemplated that various additional modifications could be made without deviating from the spirit and scope of the present disclosure. Accordingly, it is intended that the scope of the present disclosure be dictated by the appended claims rather than by the description of the preferred embodiment.

I claim:

1. A sheet deceleration apparatus for reducing the speed of a sheet of material moving along a travel path at a first speed, the apparatus comprising:

a first rotatable roller being rotatable about a first axis, the first axis being substantially perpendicular to the travel path and the first roller being positioned on one side of the travel path;

a second rotatable roller being rotatable about a second axis, the second axis being substantially perpendicular to the travel path and the second roller being positioned on the other side of the travel path and spaced from the first roller so that the sheet of material can pass between the first and second rollers;

at least one of the first and second rollers being moveable relative to and toward the other of the first and second rollers to nip the sheet between the first and second rollers during at least a portion of the travel of the sheet past the first and second rollers to reduce the speed of the sheet;

a vacuum conveyor along the travel path subsequent the first and second rollers; and a third rotatable roller along the travel path subsequent the first and second rollers, the third roller moveable between a retracted position in which the third roller is sufficiently spaced from the sheet of material so as to not push the sheet away from the vacuum conveyor and an extended position in which the third roller is moved toward, and in contact with, the sheet of material at substantially the same time that the first and second rollers nip the sheet of material to reduce the speed of the sheet, so as to push the sheet away from the vacuum conveyor.

2. The sheet deceleration apparatus of claim 1, wherein the vacuum conveyor runs at a continuous line speed.

3. The sheet deceleration apparatus of claim 2, wherein the vacuum conveyor runs at a line speed that is substantially the same as the first speed of the travel path.

4. The sheet deceleration apparatus of claim 1, wherein the third roller is driven independently from the first and second rollers.

5. The sheet deceleration apparatus of claim 1, further comprising a linkage assembly between the third roller and one of the first and second rollers, such that the third roller is synchronized with one of the first and second rollers.

6. A method for decelerating a sheet of material traveling along a travel path at a first speed, the method comprising:

delivering the sheet of material between first and second rollers, the first and second rollers being rotatable on first and second axes, respectively, the first and second axes being substantially perpendicular to the travel path;

delivering the sheet of material to a vacuum conveyor running at a continuous line speed;

driving at least one of the first and second rollers toward the other to nip the sheet of material during at least a portion of the sheet travel between the first and second rollers to reduce the speed of the sheet; and driving a third roller toward the sheet of material traveling along the vacuum conveyor to push off the sheet from the vacuum conveyor;

wherein the third roller and at least one of the first and second rollers are driven in synchronization.

7. The method of claim 6, wherein the continuous line speed of the vacuum conveyor is substantially the same as the first speed of the travel path.

8. The method of claim 6, wherein a single servo motor is used for driving the third roller and at least one of the first and second rollers in synchronization.

9. The method of claim 6, further comprising forming the sheet of material on a rotary press prior to delivering the sheet of material between first and second rollers.

10. A sheet stacking apparatus comprising:

an entry conveyor for delivering sheets of material along a travel path toward a discharge end of the entry conveyor;

a stacking hopper positioned downstream from the discharge end of the entry conveyor;

a sheet deceleration apparatus positioned between the discharge end of the entry conveyor and the stacking hopper for reducing the travel speed of the sheets of material prior to delivery to the stacking hopper, the sheet deceleration apparatus comprising first roller positioned below the travel path and a second roller positioned above the travel path, the rollers being moveable relative to each other to nip the sheets between the first and second rollers during at least a portion of the travel of the sheets past the first and second rollers;

an exit conveyor positioned at least partially downstream of the sheet deceleration apparatus for controlling delivery of the sheets of material to the stacking hopper, the exit conveyor comprising a vacuum; and a kicker apparatus for releasing the sheets of material from the exit conveyor at substantially the same time as the first and second rollers nip the sheets.

11. The sheet stacking apparatus of claim 10, wherein the exit conveyor has a continuous line speed.

12. The sheet stacking apparatus of claim 10, wherein the kicker apparatus is synchronized with at least one of the first and second rollers.

13. The sheet stacking apparatus of claim 10, wherein the kicker apparatus is driven independently from the first and second rollers.

* * * * *